(12) United States Patent
Heineman et al.

(10) Patent No.: US 8,072,204 B1
(45) Date of Patent: Dec. 6, 2011

(54) CONTROL SYSTEM OPTIMIZATION VIA DIGITAL DIODE EMULATION

(75) Inventors: Douglas E. Heineman, Lakeway, TX (US); Chris M. Young, Austin, TX (US); Gregory T. Chandler, Austin, TX (US)

(73) Assignee: Zilker Labs, Inc., Austin, TX (US)

( * ) Notice: Subject to any disclaimer, the term of this patent is extended or adjusted under 35 U.S.C. 154(b) by 721 days.

(21) Appl. No.: 12/118,290

(22) Filed: May 9, 2008

Related U.S. Application Data

(60) Provisional application No. 60/917,059, filed on May 9, 2007.

(51) Int. Cl.
  *G05F 1/56*  (2006.01)
  *G05F 1/563*  (2006.01)
  *G05F 1/565*  (2006.01)
  *G05F 1/575*  (2006.01)

(52) U.S. Cl. .................................. 323/284; 323/285

(58) Field of Classification Search ................ 323/265, 323/267–268, 273–274, 279–285
See application file for complete search history.

(56) References Cited

U.S. PATENT DOCUMENTS

| | | | |
|---|---|---|---|
| 5,675,480 A * | 10/1997 | Stanford | .......................... 307/58 |
| 6,456,133 B1 | 9/2002 | Nair et al. | |
| 6,933,759 B1 | 8/2005 | Wu et al. | |
| 6,940,328 B2 | 9/2005 | Lin et al. | |
| 7,015,739 B2 | 3/2006 | Lee et al. | |
| 7,028,207 B2 | 4/2006 | Gomm | |
| 7,388,444 B2 | 6/2008 | Liao | |
| 7,489,173 B1 | 2/2009 | Verma et al. | |
| 7,545,190 B2 | 6/2009 | Chiang et al. | |
| 7,764,885 B2 | 7/2010 | Nguyen et al. | |
| 7,852,761 B2 | 12/2010 | Neugebauer | |
| 2004/0201279 A1 * | 10/2004 | Templeton | ...................... 307/11 |

* cited by examiner

*Primary Examiner* — Gary L Laxton
*Assistant Examiner* — Nusrat Quddus
(74) *Attorney, Agent, or Firm* — Meyertons Hood Kivlin Kowert & Goetzel, P.C.; Jeffrey C. Hood

(57) ABSTRACT

The operation of a voltage regulator (or point-of-load regulator) may be optimized, by performing diode emulation using the low-side output transistor (LS FET). The voltage regulator may be monitored for a specified trigger event, which may include an averaged value of the load current dropping below a threshold value, and upon recognizing the trigger event, one or more of a number of possible diode emulation algorithms may be enabled. In one algorithm, the duty-cycle of the LS FET control signal may be set to a specified value, then adjusted until the duty-cycle of the high-side output transistor (HS FET) control signal settles and steady state is reached. The duty-cycle of the LS FET control signal may then be adjusted, and the duty-cycle of the HS FET control signal monitored, until the monitoring indicates that the duty-cycle of the HS FET control signal has reached a minimum value, thereby optimizing operation of the voltage regulator with respect to power loss. The averaged current may be based on actual load current measurements, or it may be calculated. In the latter case, discontinuous operation of the regulator may be determined based on the duty-cycle of the HS FET control signal deviating from its highest value.

26 Claims, 8 Drawing Sheets

CONTROL SYSTEM OPTIMIZATION VIA DIGITAL DIODE EMULATION

PRIORITY CLAIM

This application claims benefit of priority of U.S. provisional application Ser. No. 60/917,059 titled "High Performance Power Conversion and Digital Power Control", filed May 9, 2007, which is hereby incorporated by reference in its entirety as though fully and completely set forth herein.

BACKGROUND OF THE INVENTION

1. Field of the Invention

This invention relates to feedback systems and, more particularly, to optimizing operation of the feedback system, such as a voltage regulator, with respect to one or more operating characteristics, such as power efficiency, by performing digital diode emulation.

2. Description of the Related Art

The rapid evolution and increased power consumption of commercial integrated circuits, such as microprocessors and graphics processors, has created new and significant problems in delivery of the power to and removal of waste heat from these ICs. Power supply design is now a much more critical and difficult task than it was a few years ago. High-current/low-voltage ICs require a very clean and stable source of DC power. The power source must be capable of delivering very fast current transients. The electronic path to these loads must also have low resistance and inductance (a 1.5V supply would be completely dropped across a 25 mΩ resistance at 60 Amps).

Traditionally, DC power supplies were designed to convert AC line voltage to one or more DC outputs that would be routed throughout a system to the points of load (POL). However, it may not be practical to route high-current signals throughout a system. To overcome this difficulty, and to reduce the ill effects of distributing high current signals around a system, an alternative method of distributing power at modest voltage and current levels has been adopted. Rather than converting an AC supply voltage level to the DC voltage level required by various loads at a central location, the AC supply voltage is typically converted to a "reasonable" DC voltage and routed to the "point of load" (POL), where it is converted locally to the required low voltage. This technique is referred to as "Distributed Power Architecture", or DPA.

In many power distribution systems it is typically not enough to just distribute power around a system to the various POLs. Complex electronic systems are generally monitored and controlled to ensure maximum reliability and performance. Functions (power supply features) typically implemented in DPA systems include supply sequencing, hot swap ability, ramp control, voltage programming, load monitoring, tracking, temperature monitoring, fan speed control, phase control, current sharing, switching frequency programmability, and switching clock synchronization, to name a few. There are other functions that may be required for power systems. For example, single points of temperature measurement, open/closed status of doors and vibration may be of interest.

In order to accommodate a demand for more power and denser systems and the resulting new distribution problems, many present power distribution schemes began offering multiples of each solution, or functions, in a single package. Typically each of these functions requires a separate configuration within the system. That is, each function may require its own interconnection network tying the POL converters together. The interconnection network may implement glue-logic that may be required for control of the POL converters in order for the particular function to be successfully executed during system operation. Many of these functions comprise analog signal control requiring corresponding analog signal lines, with POL converters interconnected in point-to-point configurations. Routing of such signals is often difficult, while no true communication is established between various POL converters and/or between the POL converters and any other elements of the system. In an effort to tie all or most of these functions together at the system level, one approach has been to implement the functions in control ICs responsible for controlling respective POL converters. Some of the functionality may also be programmed into a microcontroller that may communicate with attached POL converters over an I2C (inter-IC communication) bus to coordinate control of all POL converters in the system.

DC-to-DC conversion is often performed by switching power regulators, or step-down regulators, converting a higher voltage (e.g. 12V) to a lower value as required by one or more load devices. A common architecture features distribution of the higher voltage to multiple power regulators, each producing a different (or possibly the same) voltage to one or more loads. Switching power regulators often use two or more power transistors to convert energy at one voltage to another voltage. One common example of such a power regulator 100, commonly called a "Buck Regulator" is shown in FIG. 1. Buck Regulator 100 typically switches a pair of power transistors (108 and 110) in order to produce a square-wave at their common node SW. The produced square-wave can be smoothed out using an LC circuit comprising inductor 112 and capacitor 114 to produce the desired voltage, $V_{out}$. A control loop, comprised of an Error Amplifier 116, a Proportional-Integral-Differential (PID) Filter 102, a Pulse-Width-Modulator (PWM) 104, and an Output Control circuit 106, can be configured to control the duty-cycle of the output square-wave, and hence the resulting value of $V_{out}$.

However, in a feedback control system such as the control loop configured in the Buck Regulator shown in FIG. 1, the actual duty cycle value—for the output square-wave of Output Control circuit 106—required to maintain regulation of $V_{out}$ may deviate from a nominal (ideal) duty cycle value that would be required to maintain regulation of $V_{out}$ in an ideal, lossless system. In other words, as a result of the feedback system experiencing energy loss(es), manifested for example as excess heat, the actual duty cycle value required to maintain regulation of $V_{out}$ will deviate from an ideal duty cycle value (required to maintain regulation of $V_{out}$), in proportion to the incurred loss(es). In general, various parameters (that may or may not directly affect regulation of a system output like $V_{out}$) may lead to conduction losses in the system. One of these parameters may be the on-time (or duty-cycle) of the low-side FET configured in Buck Regulator 100. It may therefore be desirable to adjust the on-time (or duty-cycle) of low-side FET 110 in a manner that optimizes system efficiency, without adversely affecting the regulation of the output voltage $V_{out}$ of Buck Regulator 100.

Many other problems and disadvantages of the prior art will become apparent to one skilled in the art after comparing such prior art with the present invention as described herein.

SUMMARY OF THE INVENTION

In one set of embodiments, a voltage regulator, or point-of-load (POL) regulator may be configured to operate a low-side output transistor (LS FET) of its output stage in diode emulation mode, in response to a specified trigger event or condition corresponding to the regulator entering discontinuous mode of operation. Each time the trigger event occurs, one or more of a number of possible diode emulation algorithms may be enabled. In one set of embodiments, the trigger event may correspond to an averaged value of the load current dropping below a threshold value. In another set of embodiments the trigger event may correspond to the duty-cycle of the control signal of a high-side output transistor (HS FET) of the regulator's output stage deviating from its highest (maximum) value. The duty-cycle of the control signal of the LS FET may be set to a specified value in response to the trigger event, and adjusted until the duty-cycle of the control signal of the HS FET settles, and steady state is reached. The duty-cycle of the control signal of the LS FET may be adjusted again and the duty-cycle of the control signal of the HS FET may be monitored, until the monitoring indicates that the duty-cycle of the control signal of the HS FET has reached a minimum value, to optimize operation of the voltage regulator with respect to power loss. The averaged current may be based on actual load current measurements, or it may be calculated, in case load current measurements are not available, or are not taken.

In another set of embodiments, the output of a control system may be regulated, by monitoring the control system for a specified trigger event, and performing one or more algorithms in response to the occurrence of the specified trigger event. In one algorithm, the present value of a parameter of a first control signal may be set to a specified value, a present value of a corresponding parameter of a second control signal may be obtained, and the present value of the parameter of the first control signal may then be continually adjusted until the obtained present value of the corresponding parameter of the second control signal does not deviate from a most recent previously obtained present value of the corresponding parameter of the second control signal by more than a specified first amount. The output of the system may be controlled using the first control signal and the second control signal. When the control system comprises a POL regulator and the output of the control system is the output voltage of the POL regulator, the specified trigger event may correspond to a present averaged value of the load current of the POL regulator falling below a threshold value of the load current of the voltage regulator, or it may correspond to the present value of the corresponding parameter of the second control signal deviating from a highest value of the corresponding parameter of the second control signal.

In one set of embodiments, the specified value of the parameter of the first control signal may be calculated as a function of the threshold value of the load current, the averaged value of the load current, an input voltage of the voltage regulator, the output voltage of the voltage regulator, and a first scaling factor. In one embodiment, the threshold value corresponds to an averaged value of the load current of the voltage regulator at a time the value of the load current of the voltage regulator is zero, or, in other words, when the regulator enters discontinuous mode of operation. The present value of the parameter of the first control signal may further be adjusted until the present value of the corresponding parameter of the second control signal reaches a minimum value.

The output voltage of a POL regulator may be regulated by monitoring the POL regulator for a trigger event, measuring the duty-cycle of a first control signal to obtain a measured duty-cycle of the first control signal, and, setting a duty-cycle of a second control signal to a specified duty-cycle in response to the monitoring indicating the trigger event. The duty-cycle of the second control signal may subsequently be adjusted until the measured duty-cycle of the first control signal does not deviate from a most recent previously measured duty-cycle of the first control signal by more than a specified first amount. In one set of embodiments, the load current of the POL regulator may also be monitored, and an averaged load current of the POL regulator may be determined based on the monitored load current. In these embodiments, the specified trigger event may correspond to the determined averaged load current of the voltage regulator reaching or falling below a designated threshold value.

In one embodiment, a system may comprise a voltage (POL) regulator that includes an output stage configured to generate an output voltage, which may be regulated by the POL regulator using a first control signal and a second control signal. The POL regulator may further include control circuitry configured to monitor the voltage regulator for a trigger event, and in case the trigger event occurs, measure a duty-cycle of the first control signal to obtain a measured duty-cycle of the first control signal, set a duty-cycle of the second control signal to a specified duty-cycle, and after having set the duty-cycle of the second control signal to the specified duty-cycle, adjust the duty-cycle of the second control signal until the measured duty-cycle of the first control signal does not deviate from a most recent previously measured duty-cycle of the first control signal by more than a specified first amount.

The output stage of the POL regulator may include a high-side transistor having a first channel terminal coupled to a first channel terminal of a low-side transistor, with the high-side transistor having a second channel terminal coupled to an input voltage of the voltage regulator, and the low-side transistor having a second channel terminal coupled to a voltage reference, with the first control signal controlling the high-side transistor and the second control signal controlling the low-side transistor. One or more power control systems may be configured with POL regulators operating according to the principles described above, with the POL regulators communication with each other over a common bus, which may be a serial bus.

BRIEF DESCRIPTION OF THE DRAWINGS

The foregoing, as well as other objects, features, and advantages of this invention may be more completely understood by reference to the following detailed description when read together with the accompanying drawings in which.

Figure 1:
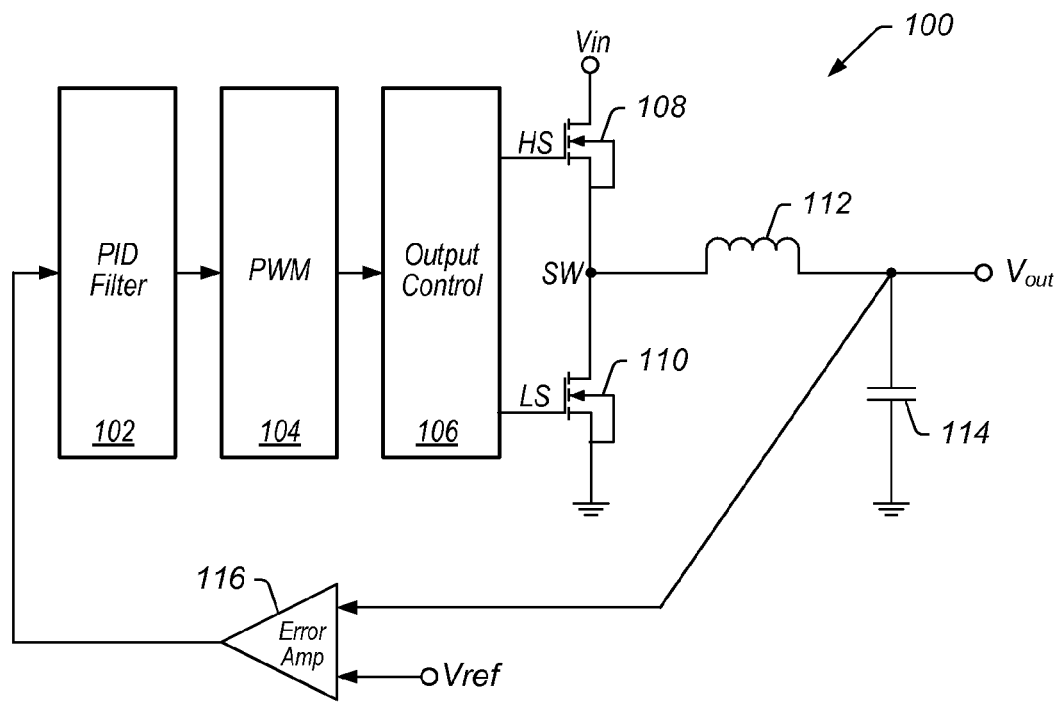
FIG. 1 shows one embodiment of a power regulator (Buck Regulator), according to prior art.

While the invention is susceptible to various modifications and alternative forms, specific embodiments thereof are shown by way of example in the drawings and will herein be described in detail. It should be understood, however, that the drawings and detailed description thereto are not intended to limit the invention to the particular form disclosed, but on the contrary, the intention is to cover all modifications, equivalents, and alternatives falling within the spirit and scope of the present invention as defined by the appended claims. Note, the headings are for organizational purposes only and are not meant to be used to limit or interpret the description or claims. Furthermore, note that the word "may" is used throughout this application in a permissive sense (i.e., having the potential to, being able to), not a mandatory sense (i.e., must)."

DETAILED DESCRIPTION OF THE PREFERRED EMBODIMENTS

Incorporation by Reference

U.S. Publication No. 20040201279 titled "Method and apparatus for improved DC power delivery management and configuration" and filed on Apr. 8, 2004, whose inventor is James W. Templeton, is hereby incorporated by reference in its entirety as though fully and completely set forth herein.

U.S. patent application Ser. No. 11/198,698 titled "Method For Using A Multi-Master Multi-Slave Bus For Power Management" and filed on Aug. 5, 2005, whose inventors are Kenneth W. Fernald, James W. Templeton and John A. Wishneusky, is hereby incorporated by reference in its entirety as though fully and completely set forth herein.

U.S. patent application Ser. No. 12/118,358 titled "High Performance Power Conversion and Digital Power Control" and filed on May 9, 2008, whose inventor is Chris M. Young, is hereby incorporated by reference in its entirety as though fully and completely set forth herein.

As previously mentioned, one example of a feedback system may be directed to DC-to-DC conversion, which may be performed by a switching power regulator using two or more power transistors, which may operate to convert energy at one voltage to another voltage. In general, as used herein, the terms "voltage regulator" and "point-of-load (POL) regulator" are used interchangeably to refer to a device configured to perform voltage conversion, and which may include not only feedback control circuitry, but also additional control circuitry configured to perform one or more functions related to power regulation and control, in addition to performing voltage conversion. A POL regulator may also be divided into the voltage converter section, which essentially comprises an output stage of the POL regulator, and control circuitry, which may comprise all other functionality of the POL regulator, including the regulating and control functions. In one set of embodiments, the control circuitry may be implemented on an integrated circuit, and coupled to an external output stage to construct a complete POL regulator. One power regulator, a Buck Regulator, was shown in FIG. 1. In general, transistors 108 and 110 may be controlled such that they do not conduct current at the same time. Typically, when transistor 108 is turned on (HS is asserted), transistor 110 may be turned off (LS is de-asserted). However, depending on the details of the power stage and its load, the efficiency of the regulator may be improved by careful control of the relationship between the two gate control signals, HS and LS.

Figure 2:
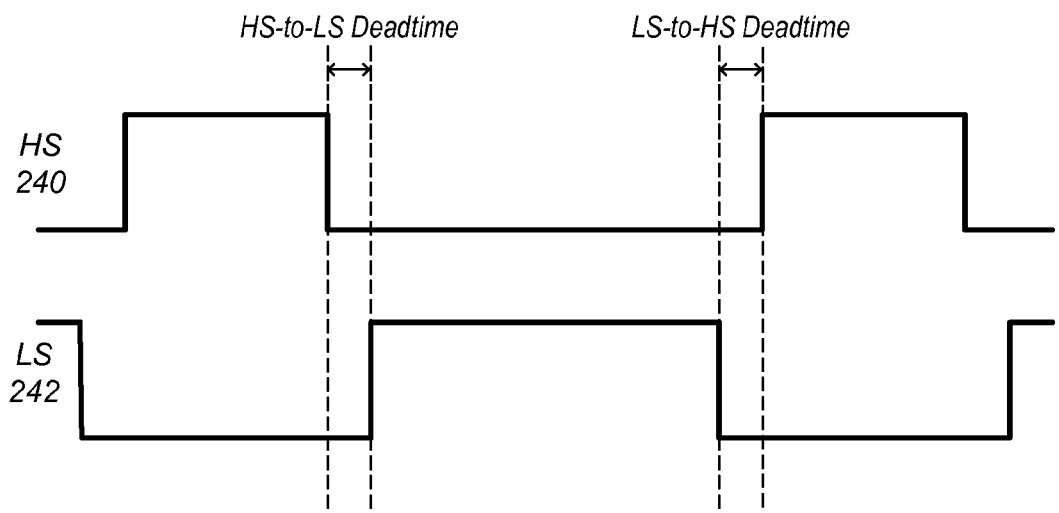
FIG. 2 shows one possible timing diagram for the high side FET and low side FET pulse width modulated (PWM) control signals for the Buck Regulator of FIG. 1 according to prior art.

FIG. 2 illustrates a simple timing diagram for a Buck Regulator, such as the regulator shown in FIG. 1. As shown in FIG. 2, a brief "deadtime" may be generated between transistor 408 being disabled—shown as HS signal 240 de-asserting from a high value to a low value—and transistor 110 being enabled—shown as LS signal 242 asserting from a low value to a high value. The period during which both devices are turned off generally eliminates the possibility of their conducting current directly from the input to ground. If the deadtime is too short, such cross-conduction could waste power. If the deadtime is too long, the body-diode of transistor 110 may conduct current, thereby also wasting power. It is therefore desirable to optimize the timing to obtain greater efficiency, that is, the highest possible ratio of the output power to the input power ($P_{out}/P_{in}$). In general, power efficiency may be thought of as $P_{out}/P_{in}$, and higher efficiency may be regarded as a higher value of the $P_{out}/P_{in}$ ratio. While regulation of the output voltage $V_{out}$ in Regulator 100 takes places primarily by adjusting the duty-cycle of the square waves (shown in FIG. 2, for example) based on $V_{out}$ according to the feedback loop, a waste, or power loss (inefficiency of the system) will also have an effect on the value of the duty-cycle.

Consequently, because the deadtime between signals HS 240 and LS 242 affects power efficiency, the deadtime will have an indirect effect on the value of the duty-cycle. In one sense, deadtime may be considered an independent parameter that may lead to power loss (as explained above). In this context, deadtime may be considered an independent parameter since it is not a parameter that is configured to directly regulate the value of the output voltage $V_{out}$. In one set of embodiments, it can be demonstrated that power loss (waste of power; inefficiency) actually leads to an increase in the value of the duty-cycle at which regulation of $V_{out}$ may be maintained. As a result of the above-mentioned relationship between deadtime and the duty-cycle value, an optimal value of the deadtime may be determined by monitoring the duty-cycle and adjusting the deadtime until the duty-cycle reaches a minimum value at which regulation of $V_{out}$ can be maintained. The deadtime value thus obtained may correspond to an optimum deadtime value at which the system operates with maximum efficiency. In other words, the deadtime value thus obtained represents minimized loss with respect to the deadtime parameter, and thus represents maximized efficiency with respect to the deadtime parameter.

In general, in certain control systems, the actual value of a control parameter corresponding to a main control signal configured to maintain regulation of the output of the system may deviate from what the value of the control parameter would be in an ideal, lossless system. More broadly, the control parameter may deviate from what the value of the control parameter would be if an operating characteristic of the feedback system did not deviate from an expected, nominal target value or level. Accordingly, a relationship between various operating characteristics of the system and the control parameter, and between the operating characteristics and one or more independent parameters may be established. Again, an independent parameter may comprise a parameter that had not been designated to directly regulate an output of the system. For example, in pulse modulated control systems, the actual value of the duty-cycle required to maintain regulation of the output of the system would deviate from what the value of the duty-cycle would be in an ideal, lossless system. Typically, the actual value of the control parameter may deviate from the ideal value in proportion to the change in operating characteristic of the system, in this case in proportion to the losses. As previously mentioned, in a power regulator (voltage regulator such as Regulator 100) the operating characteristic may be loss, more specifically power loss according to $P_{out}/P_{in}$. Overall, in electrical systems, loss may represent charge loss (leading to heat), while in other systems loss might represent fluid loss, force loss, motion or mobility loss, etc.

Figure 3:
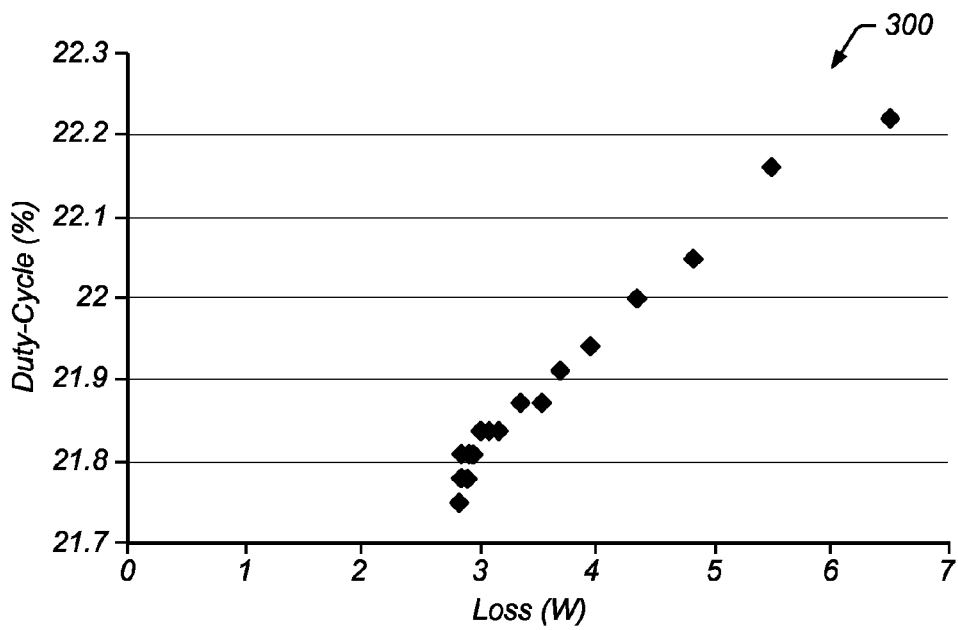
FIG. 3 shows a graph illustrating the relationship between duty-cycle value and power loss in a PWM feedback control system, according to prior art.
Figure 4:
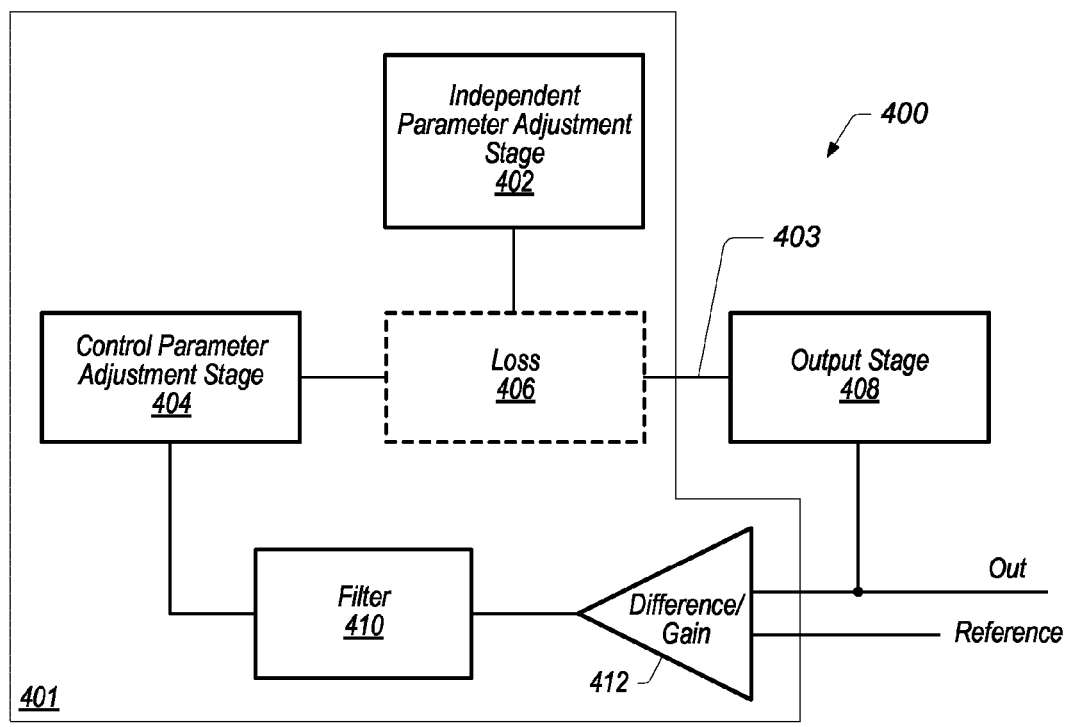
FIG. 4 shows one embodiment of a feedback control system in which an independent parameter may be adjusted to improve efficiency of the system while maintaining regulation of the system output.

FIG. 3 shows a graph 300 illustrative of a relationship of the duty-cycle value and efficiency (power) loss in a system such as Regulator 100. As graph 300 indicates, the duty-cycle value increases with increased power loss in the system. In a voltage regulator, such as Regulator 100, power loss may be effected by a variety of independent parameters, not only by the deadtime value, which was described above. In general, there may be at least one independent parameter that would lead to a loss of efficiency in an electrical system. FIG. 4 shows one embodiment of a system 400 comprising an output stage 408, which may be configured to generate an output (Out), and a control stage 401 configured in a control loop with output stage 408. Control stage 401 may include a control parameter adjustment (CPA) stage 404, which may adjust a control parameter based on the output signal Out and a Reference signal. In one set of embodiments, a Difference/Gain stage 412 may compare Out with the Reference value to generate a difference signal that is filtered through filter 410, and provided to CPA stage 404, which may adjust the control parameter according to the filtered difference signal. The output Out may thereby be regulated according to the feedback (control) loop.

As shown in FIG. 4, an independent parameter may affect an operating characteristic of system 400, for example the efficiency of system 400, which is represented in FIG. 4 by block 406 labeled "Loss". While in the embodiment shown the operating characteristic represents efficiency/power-loss, which may be manifested as charge loss leading to heat, in other systems the operating characteristic may correspond to fluid loss, force loss, motion or mobility loss, for example. As previously discussed, in an electrical system the loss may refer to power loss, as defined by $P_{out}/P_{in}$. In order to optimize for this loss with respect to the independent parameter, the independent parameter may be adjusted at the independent parameter adjustment (IPA) stage 402, the impact on the control parameter may be observed, and the independent parameter may then be adjusted until the control parameter adjusted by CPA 404 reaches a value that corresponds to the targeted level of the operating characteristic, which may mean optimized efficiency with respect to power loss. In general, the independent parameter may be adjusted until the control parameter reaches a value that is within a specific range of values of the control parameter, which may correspond to the targeted efficiency level of the operating characteristic with respect to the independent parameter.

In general, the targeted level of the operating characteristic may be related to various criteria, parameter values, or ranges of parameter values. In some cases, the exact values, for example the actual a range of parameter values, may not be known, but a criterion may well be established prior to system operation. In other words, a clear association may be established between the target level of the operating characteristic and one or more criteria. An example of a criterion may be the duty-cycle reaching a minimum, or the change of the duty-cycle indicating an increase in the duty-cycle. The optimal value or range of adequate values may not be known in advance, but the criterion may be specified. For example, one criterion may be specified as a derivative (e.g. change of duty-cycle) with respect to the independent variable changing sign (e.g. switching from a negative value to a positive value). Accordingly, a specific value or specific range of values of the control parameter are meant to encompass values of the control parameter that satisfy the specified criteria corresponding to the target level or desired target level of the operating characteristic.

Figure 4B:
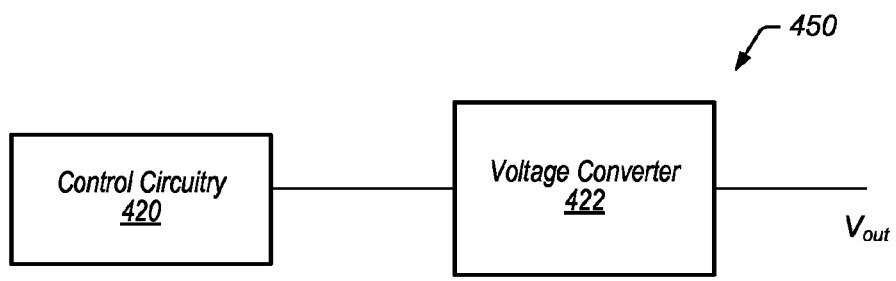
FIG. 4B shows a simplified diagram of one embodiment of a POL regulator that includes a voltage converter, and control circuitry for performing regulating and control functions of the voltage converter.

FIG. 4B shows a simplified diagram of a POL regulator 450 comprising control circuitry 420, which may be custom circuitry, a controller or processor executing code (e.g. firmware), etc., configured to perform monitoring and select control functionality, and voltage converter 422. In one set of embodiments, control circuitry 420 may be configured on an integrated circuit, and voltage converter 422 may be a voltage regulator such as Regulator 100 shown in FIG. 1. Alternately, voltage regulator 422 may simply comprise a voltage converter (output stage), such as the output stage (comprising HS FET 108, LS FET 110, inductor 112, and capacitor 114) of Regulator 100, while the remaining components of Regulator 100 may be comprised in control circuitry 420, which may also comprise additional circuitry to perform additional functionality of POL 450 regulator.

Considering Regulator 100 (or POL regulator 450) as an example of system 400, the independent parameter may be the deadtime, and the control parameter may be the duty-cycle of the control signal(s) HS 240 and LS 242. Thus, the specific range of values may be designated as a single value, in this case the minimum value of the duty-cycle at which control stage 401 is operable to maintain regulation of output Out ($V_{out}$ in Regulator 100). In some embodiments the specific range of values may be obtained through observation, in other embodiments it may be obtained through calculations. Those skilled in the art will appreciate that the specific value or specific range of values may be determined in a variety of ways other than what has specifically been mentioned.

Thus, IPA 402 may adjust the independent parameter (e.g. deadtime) until the control parameter (e.g. duty-cycle) reaches a minimum value, which may correspond to the least amount of efficiency loss, and may thus maximize efficiency with respect to the independent parameter. In one set of embodiments, there may be more than one adjustable independent parameter, and therefore more than one parameter may be adjusted to optimize efficiency, or to reach the target level of any selected operating characteristic or characteristics. In such cases at least one optimal value of the control parameter may be determined, for example through observation (as mentioned above), and the one or more independent parameters may be adjusted in concert with each other until the optimal value of the control parameter is obtained through CPA 404. Examples of independent parameters that can impact efficiency in power regulators, such as Regulator 100 include deadtime (as previously discussed), gate duration, gate voltage, switching frequency, operating temperature, input voltage, output voltage, output current, and gate drive current. Those skilled in the art will appreciate that other such parameters may also exist depending on specific configurations and system components of a given power regulator.

Adaptive Frequency

Figure 5:
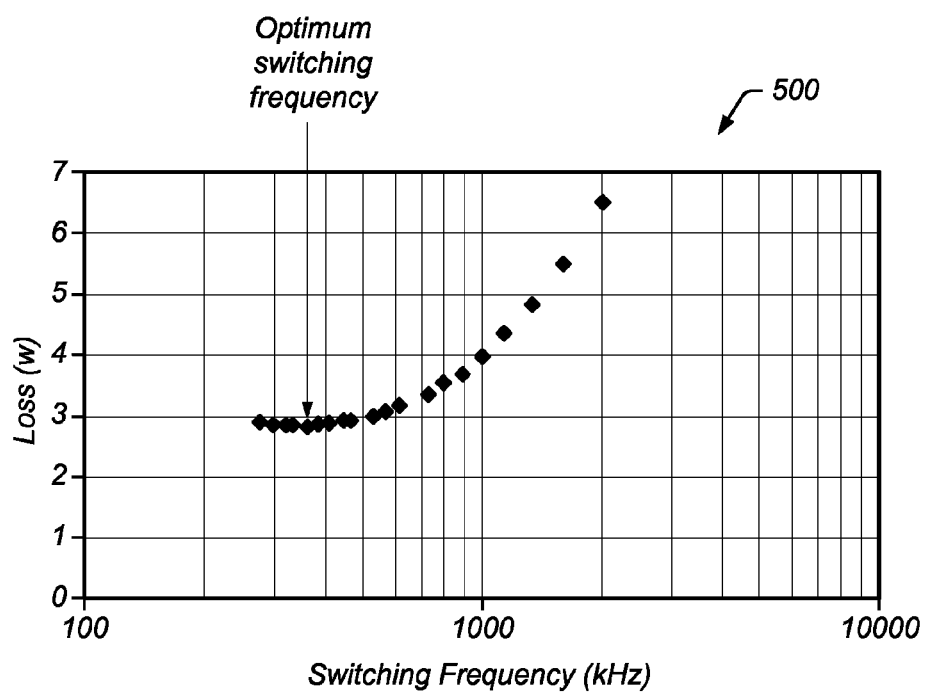
FIG. 5 shows a graph illustrating the relationship between switching frequency and power loss in a PWM feedback control system, according to one embodiment.

Another example of an independent parameter that may affect/impact the efficiency of a power/voltage regulator is the switching frequency. As switching frequency is changed in a pulse modulated power conversion system, the energy losses may increase or decrease. As switching frequency is increased, for example, switching losses increase leading to a decrease in efficiency. On the other hand, as frequency is decreased, the RMS (root mean square) current to average current ratio may increase, leading to high conduction losses, and therefore to lower efficiency. There may be, then, an optimal switching frequency at which the system may operate with an optimal efficiency, for a given set of topological, component, parametric, and environmental conditions. FIG. 5 shows one example graph 500 of the relationship between switching frequency (given in KHz, on the horizontal axis) and power loss (given in Watts, one the vertical axis). In the embodiment shown, the value of the switching frequency at which the system appears to be operating at an optimum efficiency—that is with the least amount of loss—is around 360 kHz.

In one set of embodiments, the switching frequency (e.g. the frequency of signal(s) HS 240 and LS 242 for Regulator 100) may be adjusted, based on the relationship between the duty-cycle, switching frequency, and efficiency, according to the principles described above. Accordingly, as the switching frequency is adjusted, the resulting value of the duty-cycle may be compared to the previous value of the duty-cycle. If the resulting value of the duty-cycle is less than the previous value of the duty-cycle, then the switching frequency may be changed until the value of the duty-cycle begins to increase. It should be noted, that the duty-cycle may vary from adjustments made to the duty-cycle based on the feedback loop (e.g. by CPA 404 as shown in FIG. 4), the duty-cycle being the primary control parameter configured in the feedback loop to maintain regulation of the output $V_{out}$. The switching frequency may then be maintained such that the duty-cycle is minimized. This may be performed in either a continuous or discontinuous mode of operation of the power/voltage regulator. Continuous mode of operation may be designated as a time when current is continuously flowing in the inductor, e.g. in inductor 112 of Regulator 100, while discontinuous mode may refer to a time when the inductor is not conducting any current.

Overall, optimal operation, or improved operation (with respect to efficiency) of the system may be maintained by adjusting the switching frequency according to one of various different algorithms. While some of the algorithms, such as previously described, may result in optimum system efficiency, other algorithms may not automatically optimize efficiency, but may operate to improve the efficiency. For example, according to one alternative algorithm, the switching frequency may be adjusted below a programmed value, which may be considered a nominal default value, when the duty-cycle of the HS 240 signal reaches a designated value, for example when it is below half of its maximum value. When the duty-cycle of the HS 240 signal is at zero, the switching frequency may saturate (i.e. it may be adjusted to reach and remain) at a fixed minimum value. When the duty-cycle of the HS 240 signal is above half of its maximum value, the switching frequency may saturate at the programmed value. These boundary conditions may therefore define a saturating linear equation for a scaling factor that may be used to scale the programmed value of the switching frequency. The linear equation may define the scaling factor as a function of the duty-cycle of the HS 240 signal, as follows:

$$sf = \frac{\frac{(f_{NOM} - f_{MIN})*2*D}{D_{MAX}} + f_{MIN}}{f_{NOM}}, \quad (1)$$

where 'sf' is the scaling factor, '$f_{NOM}$' is the nominal (programmed) switching frequency, '$f_{MIN}$' is a specified minimum switching frequency, 'D' is the monitored duty-cycle value (which may be adjusted as per CPA stage 404), and '$D_{MAX}$' is the maximum duty-cycle value. It should be noted that while '$D_{MAX}$' is used here to reference a maximum value of the duty-cycle, the equation may be modified to account for the value of the duty-cycle coming within a specified range of '$D_{MAX}$'. In one set of embodiments, if the value of the scaling factor exceeds 1, it may be (re)set to 1.

The minimum switching frequency value may be specified as one of two values. A first value may be specified as 700 KHz, for example, and may be used when the programmed frequency is above or equal to a specified threshold value, e.g. 750 KHz. A second value may be specified as 200 KHz, for example, and may be used when the programmed frequency is below the specified threshold value (e.g. 750 KHz). The switching frequency may be adjusted once per main loop iteration. The switching frequency scaling factor target value may be calculated using the formula (I) shown above, and may be used to adjust the operating switching frequency. In one set of embodiments, for example when a PLL (phase-locked loop) is used, the value of a PLL divider register may be adjusted toward the scaling factor target value by a specified increment, e.g. a unit value, for each iteration of the main loop (such as the feedback loop of Regulator 100 in FIG. 1). When the duty-cycle of the HS 240 signal settles, the target switching frequency may also settle, and the register value may converge to the scaling factor target value. This behavior may operate to prevent any voltage spikes. Frequency adaptation may be automatically disabled during ramp-up and ramp-down times of the voltage regulator. As previously mentioned, while the alternative algorithm described above may not automatically optimize the efficiency of the system with respect to the switching frequency, it may substantially improve the efficiency of the system.

Overall, in a system in which switching frequency of a control signal may be considered an independent parameter (as described above), the efficiency of the system may be improved by implementing an algorithm that automatically adjusts the switching frequency when a control parameter (which may correspond to a control signal) used for maintaining regulation of the system output reaches a specified value, or is within a specified range of values. The switching frequency may be adjusted based on a scaling factor obtained from calculations performed according to a previously specified equation or set of equations, or it may be repeatedly adjusted based on a monitored value of the control parameter.

Diode Emulation

Synchronous rectification is a technique that may be used when performing power conversion, such as pulse modulated power conversion, whereby a controlled switch (e.g. a MOSFET) is configured to operate as a rectifier. One motivation for using a switch as a rectifier is that a MOSFET switch, for example, may incur lower conduction losses than a rectifier, which it has been configured to replace. Referring to the Regulator in FIG. 1, LS FET 110 may be configured to also operate as a rectifier, thereby eliminating the need to couple a rectifier, e.g. a diode, between ground and the lower terminal of LS FET 110. Accordingly, LS FET 100 may be configured to operate to prevent current from flowing through LS FET 110 when HS FET 108 is conducting current. In other words, by configuring LS FET 110 to operate as a rectifier, shoot-through current is prevented while HS FET 108 is conducting current. However, when using a MOSFET switch (such as LS FET 110) as a rectifier in this manner, the switch is actually still capable of conducting current in both, positive and negative, directions when it is turned on. Therefore, a synchronous rectifier may not be considered a true rectifier, as it does not prevent reverse current flow. A synchronous rectifier, then, may operate as a rectifier in that it may conduct current in a forward direction in a manner in which a normal rectifier would be conducting in the forward direction. While under standard operating circumstances this may not be an issue, it may give rise to certain problems when the average current flowing in the inductor (e.g. inductor 112) falls below a certain value.

Figures 6, 7:
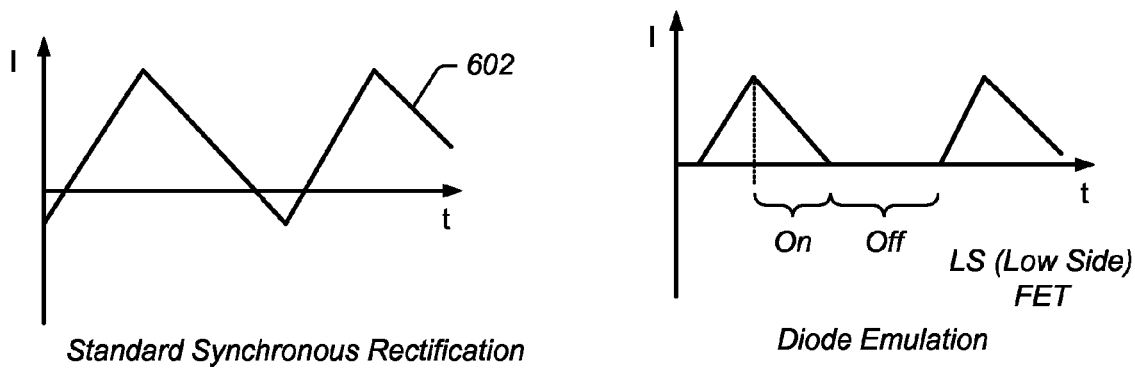
FIG. 6 shows a graph illustrating the value of the inductor current of a power regulator during standard synchronous rectification, according to one embodiment.
FIG. 7 shows a graph illustrating the value of the inductor current of a power regulator when rectification is performed using diode emulation, according to one embodiment.

In the example shown in FIG. 6, during synchronous rectification, when the average current is less than half of the ripple current 602, the current may reverse in the inductor. In FIG. 6, the vertical axis represents the current that may flow out of the voltage regulator (e.g. in inductor 112 of Regulator 100, shown in FIG. 1). Therefore, during a switching cycle, energy may be stored on the output capacitance (e.g. capacitance 114 in FIG. 1) by current flowing into the output capacitance, and when the current reverses, the stored energy may result in current flowing out of the output capacitance. This circulating current may lead to an RMS (root mean square) current much higher than the average current, further leading to conduction losses (i.e. power loss or efficiency loss) greater than would otherwise be present with the same average current. Since a true rectifier doesn't permit reverse current flow, by emulating the operation of a true rectifier (diode), a significant reduction in conduction loss may be achieved, though the efficiency may not be completely optimized.

In one set of embodiments, diode (or rectifier) emulation in a voltage regulator, e.g. Regulator 100 in FIG. 1, may be achieved by turning off LS FET 110 before current can reverse, to significantly reduce conduction losses. As illustrated in FIG. 7, the reverse current that would be conducted by the MOSFET switch (LS FET 110) may be eliminated by turning LS FET 110 off at the appropriate time, thereby emulating a true rectifier (or diode) operation. This may be in addition to having LS FET 110 already configured to prevent conducting any current when HS FET 108 is itself conducting current. There are a number of analog implementations for performing diode emulation, but such implementations typically require a low offset, zero-current-crossing detector circuit. Due to detection and switching delays, noise, and other associated issues, analog implementations of diode emulation may not always result in optimal operation, and may not provide means for achieving the lowest possible losses in a given system. In many cases the system may operate at optimum efficiency when there is actually some reverse current flow present in the inductor, and completely eliminating reverse current flow in the inductor may therefore be to the detriment of optimum efficiency. In addition, many of the analog implementations may not be cost effective.

In one set of embodiments, a mixed-signal system may be configured to implement digital diode emulation. As previously described, by deriving a relationship between a control parameter (e.g. the duty-cycle of HS signal 240) and power loss in the system (e.g. the feedback control of Regulator 100) from a relationship between the duty-cycle and an independent parameter that affects power loss in the system, efficiency may be optimized by adjusting the independent parameter based on the value of the duty-cycle. More specifically, the independent parameter may be adjusted based on a monitored (or observed) value of the duty-cycle, which may be adjusted based on the output of the system (e.g. $V_{out}$ of Regulator 100) as part of the regulation of the output of the system. In case of digital diode regulation, the duty-cycle of LS signal 242 (or the on-time of LS signal 242) may thereby also be considered as a parameter that impacts one or more operating characteristics of the regulator, such as the power efficiency of the regulator. In addition, digital diode emulation may be implemented to optimize, or to simply improve the efficiency of the regulator, and it is therefore possible to implement more than one diode emulation algorithm, including algorithms in which the duty-cycle of LS signal 242 may be adjusted without having to constantly monitor the duty-cycle of HS signal 240 once the duty-cycle of HS 240 has settled to a substantially constant value.

Diode Emulation—Conditions For Enabling Diode-Emulation

In one set of embodiments, diode emulation may be enabled when certain conditions in the system (e.g. Voltage Regulator 100) are met, or when some triggering event occurs. The triggering event may be defined and may be specific to a given implementation, although some specific examples will be given below. In response to the triggering event, diode emulation may be enabled, and one or more algorithms implementing diode emulation may be executed. The algorithms may be executed individually or in combination, depending on the desired target level of the operating characteristic, such as the desired level of power efficiency. For example, in response to the designated/specified trigger event, an updated value of the duty-cycle of LS signal 242 may be calculated and/or set according to a variety of factors, as will be further described below, and the updated duty-cycle value of LS signal 242 may serve as an initial duty-cycle value of LS signal 242 that may be further adjusted according to an additional algorithm or additional algorithms. Examples of possible algorithms and formulas for determining the duty-cycle of LS signal 242 will also further be described below.

Diode Emulation—Setting the Duty-Cycle of the LS Signal in Continuous Mode

In one set of embodiments, a first circuit, e.g. an LS modulator, (configured in PWM 104 and/or block 402, for example) may be configured to continuously adjust the duty-cycle of LS signal 242 (904) using the following formula, while operating in continuous mode:

$$D'=0.9*D*((V_{in}-V_{out})/V_{out}), \qquad (2)$$

where D' is the resultant duty-cycle of LS signal 242 (904), D is the measured duty-cycle of HS signal 240 (902), $V_{in}$ is the measured input voltage, and $V_{out}$ is the output voltage set point, that is, the nominal output voltage $V_{out}$ of the regulator. A scaling factor, in this case 0.9, may be included to keep the falling edge of the LS pulse away from the rising edge of the HS pulse by a small amount, thereby allowing the regulator (e.g. Regulator 100) to automatically exit continuous mode and enter discontinuous mode when the load current drops. In one set of embodiments, diode emulation may be configured to take advantage of performed load current measurements, as further described below in the first algorithm. However, because continuous/discontinuous transitions may be automatic, diode emulation may also be configured independently of current measurements, using a calculated (approximated) value of the averaged load current, as further described below in the second algorithm.

Diode-Emulation—Active Discontinuous Region and Load Current Monitoring

In one set of embodiments, the load (inductor) current may be monitored, and the trigger event may correspond to an averaged value of the load current reaching a specified value, or falling below a threshold value. As shown in diagram 800 of FIG. 8, such a threshold value may be a current-ripple-threshold ($I_T$) for the inductor current 802 ($I_L$), which may be programmed with a value corresponding to the averaged load current at the time the inductor enters a discontinuous mode of operation, that is, when the inductor stops conducting current for any period of time. This programmed value may be in contrast to the averaged load current at a time the inductor current has been below 0 Amps for a specified part of the switching period. The nominal averaged current value may be specified to correspond to one-half the value of the ripple current 802, that is, one-half of the peak-to-peak value of current 802. The active (discontinuous) region 804 shown in FIG. 8 may represent an operating region in which the (running, or present) average current value is right at and/or below one-half of the ripple current (as defined above). The programmed level ($I_T$) may intentionally be set higher by a certain percentage, for example by as much as 10% or more than the actual value corresponding to current 802 averaged up to the time the inductor enters a discontinuous mode of operation.

Figure 8:
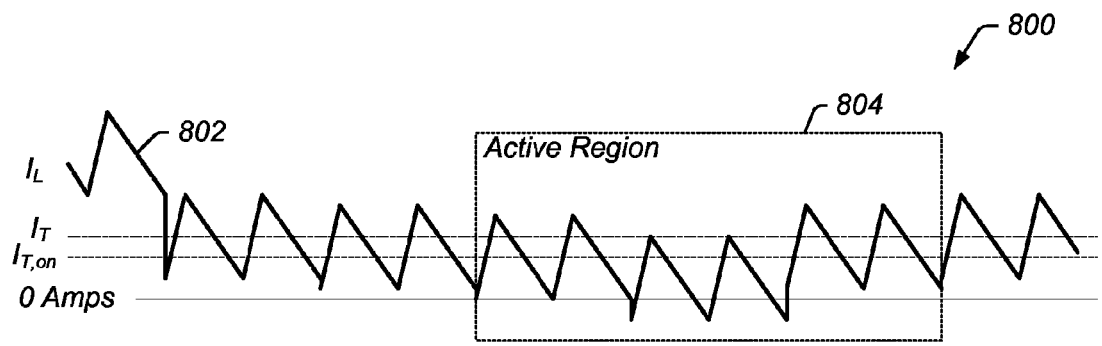
FIG. 8 shows a graph illustrating the value of the inductor current of a power regulator with respect to the active discontinuous region, according to one embodiment.

In FIG. 8, $I_{T,on}$ may therefore represent the actual value corresponding to current 802 averaged up to the time the inductor enters a discontinuous mode, and $I_T$ may represent this value increased by a specified percentage). Hysteresis may also be built into the $I_T$ control, such that from the perspective of the switching device, that is LS FET 110, $I_T$ may be considered to be in the active region if the averaged current (the average current value) had fallen below the threshold value minus a specified percentage (e.g. 10%), and it had not risen above or exceeded $I_T$. Thus, the system may be configured to enable the diode emulation algorithm when the averaged current falls to and/or below $I_{T,on}$, and discontinue diode emulation when the averaged current rises to and/or above $I_T$. The averaged current may be determined through a variety of methods, such as the method disclosed for example in U.S. patent application Ser. No. 11/366,260 titled "Method for Accurate Current Sensing in Power Converters".

The threshold ($I_T$ and $I_{T,ON}$) may be implemented for a variety of reasons, such as providing additional time that may be required to set up other parameters and/or enable/disable other specified algorithms. For example, in one set of embodiments, the threshold may provide preparation time during which certain control firmware may enable or disable various adaptive algorithms that may each be directed to improving the efficiency of the system. Such algorithms may include dead-time adjustment, diode emulation, adaptive compensation, and others. Most of the adaptive algorithms may operate to allow a control parameter—such as the duty cycle of HS 240 and/or LS 242, for example—to attain a specified value corresponding to the most efficient operation of the system. As previously mentioned, the adaptive algorithms may be directed to obtaining the lowest duty cycle in detecting the minima, and the threshold may be configured as a system flag used for arbitrating which algorithm has precedence over the regulation loop (e.g. the feedback loop shown for Regulator 100 in FIG. 1). For example, when the average current is below the $I_T$ level (from FIG. 8), the low-to-high dead-time updates (see LS-to-HS Deadtime in FIG. 2, for example) may be frozen at the last value. In the active discontinuous region (804), diode emulation may be engaged to adjust the width (in other words the duty-cycle) of LS 242 to achieve higher efficiency. Diode emulation may be automatically disabled during ramp up and ramp down times.

Diode Emulation—First Algorithm

In one set of embodiments, the diode emulation algorithm may use a present value of the averaged load current $I_L$ and the programmable current ripple threshold ($I_T$) described above to determine whether the inductor is in, or around discontinuous mode. As previously mentioned, in continuous mode the present value of the duty-cycle of LS signal 242 may be set according to the formula in equation (2). When it is determined that the inductor is in the active discontinuous region, a corresponding, present value of the duty-cycle of HS 240 may be obtained, by monitoring the duty-cycle of HS 240, for example by firmware implementing one or more of the control algorithms. The duty-cycle of HS 240 may be consecutively measured a specified number of times, or over a specified time period, for example over 1024 switch cycles, and averaged over the specified time period, e.g. over the 1024 switch cycles. It should be noted that other methods for obtaining the present value of the duty-cycle of HS signal 240 are possible and are contemplated, and are not limited to the example provided above. The duty-cycle of LS 242 may then be adjusted until the duty-cycle value of HS 240 reaches a preferred duty-cycle value of HS 240 that closely corresponds to the cross-over point where the inductor current ($I_L$) goes below 0 Amps.

Figure 9:
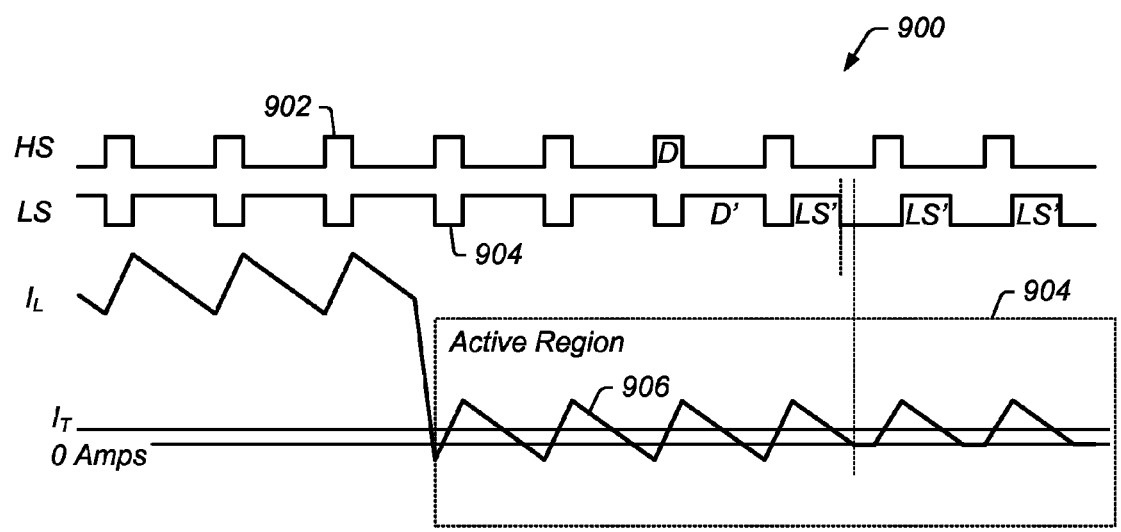
FIG. 9 shows a graph illustrating the value of the inductor current of a power regulator, and pulse width adjustment of the low side FET control signal during diode emulation, according to one embodiment.

One embodiment of this operation is shown in FIG. 9. Waveforms 902 and 904 represent HS 240 and LS 242, respectively, (see also FIG. 2), and $I_L$ 906 is again, the current flowing in inductor 112. As seen in FIG. 9, when the averaged value of $I_L$ indicates that the inductor is operating in active discontinuous region, that is, the averaged value of $I_L$ is around the threshold $I_T$, consecutive measurements of the duty-cycle of HS 902 may lead to the adjustment of the duty-cycle of LS signal 904, to the value LS', which may then be maintained while the inductor is operating in the active discontinuous region. The LS' value may also be considered an initial value of the duty-cycle of LS 242 which may further be adjusted in another algorithm, as will be further described below.

Once the measured averaged value of current $I_L$ falls below the ripple threshold $I_T$, the initial LS' value for the adjusted duty-cycle of LS signal 904 may be calculated, according to a previously specified formula, for example. One possible formula is the equation:

$$LS' = (I_{threshold} - I_{out,ave.}) * \frac{(V_{in} - V_{out})}{(V_{in} * I_{threshold})} * 2^{Resolution,LS} * 85\%. \quad (3)$$

The resolution of the value of the pulse width of LS signal 242 (904) (i.e. the duty-cycle of LS signal 904) may depend on the manner in which diode emulation is implemented. For example, in one set of embodiments, power regulation control may be implemented on an integrated circuit (IC), which may comprise a hardware portion configured to control the width of the pulse of LS signal 242 (904), and the value of the pulse width may be bounded by the number of bits dedicated to storing and generating the value of the pulse width. In one embodiment, the pulse width of LS signal 904 may be configured with 6-bits of resolution. The value LS' may intentionally be calculated to a width less than the optimal width by a certain percentage, e.g. by 85%. This may allow any subsequent diode emulation algorithm to intelligently begin its search (e.g. see the third algorithm further below, which may perform a search for a minimum duty-cycle value of HS 240 (902), and FIG. 11). If the input voltage changes, the value of LS' may need to be recalculated. In general, a variety of factors, such as a change in operating conditions, input voltage, etc. may lead to the algorithm recalculating the value of LS', due to a substantial change in the present value of the duty-cycle of HS signal 240 (902).

However, modulating the pulse width of LS signal 904 (LS 242) may require extreme care. In other words, adjusting the duty-cycle of LS 242 (904) may need to be performed very carefully. Small adjustments of LS 904 (LS 242) may result in charge displacement in inductor 112, which may lead to voltage spikes on the output ($V_{out}$). Therefore, it may be desirable to use small steps in reducing the duty-cycle of LS signal 242 (904) from D' to LS'. Even using smaller steps, output voltage ($V_{out}$) perturbations may not be completely eliminated. However, the smaller the adjustments to the duty-cycle of LS signal 242 (904), the smaller the perturbations on the output ($V_{out}$). In addition, less frequent adjustments may also provide more time for the main loop (e.g. control loop shown in FIG. 1) to recover. Therefore, changes made to the value of the duty-cycle of LS signal 242 (904) may be kept small, and the adjustments may be performed slowly. This may increase the time for the adaptive algorithms to work, without compromising the transients in the discontinuous region, since the large transient expected at light loads may be a loading case.

Figure 10:
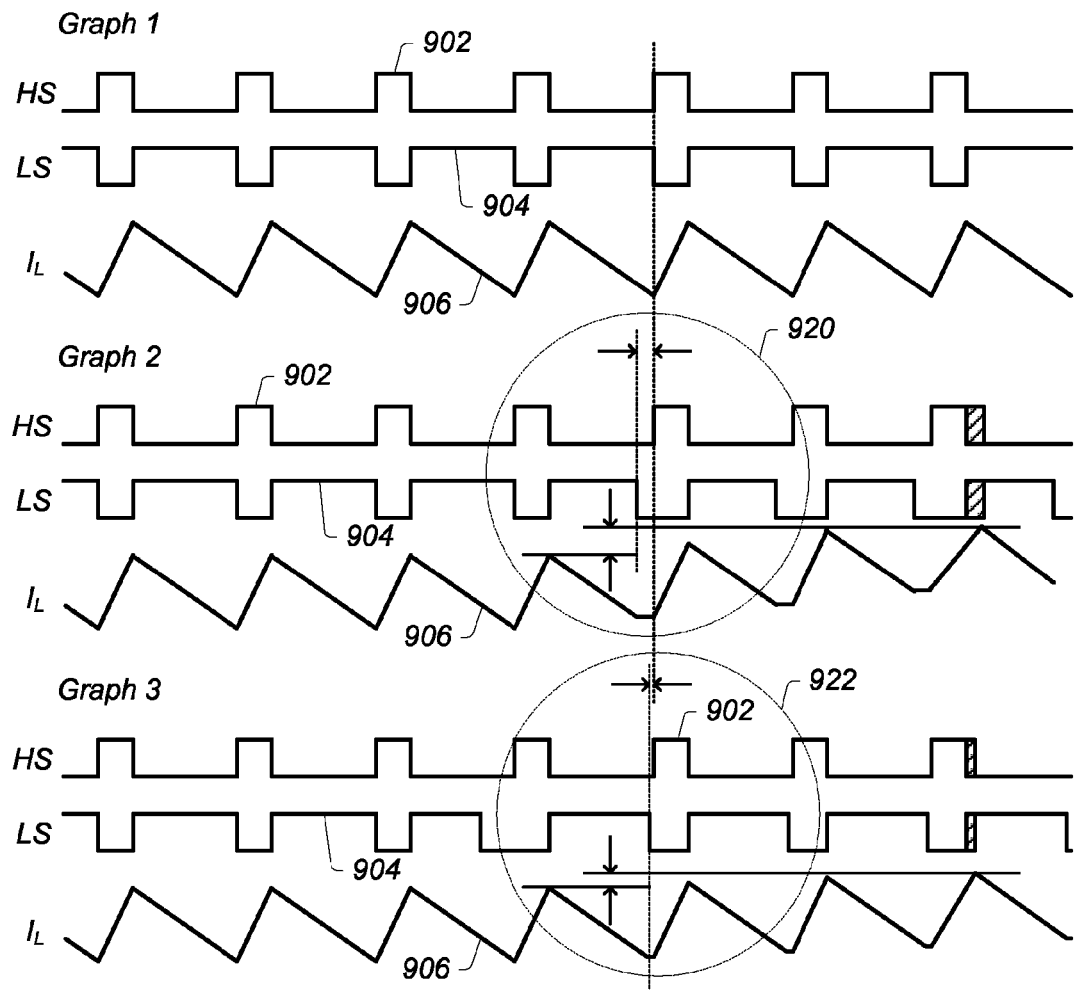
FIG. 10 shows graphs illustrating the value of the inductor current of a power regulator, and pulse width adjustment of the low side FET control signal using small steps and large steps during diode emulation, according to one embodiment.

FIG. 10 shows various graphs to illustrate the behavior of $I_L$ 906 when small step sizes and large step sizes are taken in adjusting the duty-cycle of LS signal 904. As shown in FIG. 10, Graph 1 illustrates HS 902, LS 904, and $I_L$ 906 when the inductor is operating in the active discontinuous region, prior to the adjustment of the duty-cycle of LS signal 242 (904). Graph 2 illustrates HS 902, LS 904, and $I_L$ 906 when the duty-cycle of LS signal 904 is adjusted using a relatively large step, highlighted in encircled area 920. Graph 3 illustrates HS 902, LS 904, and $I_L$ 906 when the duty-cycle of LS signal 242 (904) is adjusted using a relatively small step, highlighted in encircled area 922. As seen in Graphs 2 and 3, a smaller step size in adjusting the duty-cycle of LS signal 242 (904) may result in a smaller increase in the peak value deviation of $I_L$ from the original peak value in Graph 1.

Diode Emulation—Second Algorithm

As previously mentioned, the parameter that impacts the efficiency of the system, or power regulator (e.g. Regulator 100), in this case the pulse width of LS signal 242 (904), may also be adjusted without making the adjustment dependent on continually monitored load current. Because continuous/discontinuous transitions may be automatic, diode emulation may be configured independently of current measurements and their associated potential inaccuracy, and may be based instead on a calculated value of the averaged load current. In other words, the trigger event may not necessarily be identified based on the present value of the measured averaged load current (averaged value of $I_L$ 906) falling below a specified threshold. In one set of embodiments, diode emulation may be implemented by executing an alternative algorithm to determine whether the inductor is operating in the active discontinuous region, and to subsequently perform the adjustment of the duty-cycle of LS 242 (904) based on a calculated, rather than measured, value of the averaged current, according to the formula given in equation (3). In this algorithm, discontinuous operating mode may be recognized through monitoring the duty-cycle of the HS signal 240 (904), thereby not requiring measurement circuits for determining the zero-crossing of inductor current $I_L$.

Again, in continuous mode, the duty-cycle value of LS signal 242 may continuously be set according to the formula in equation (2) in the same manner as for the first algorithm. In discontinuous mode, the measured HS duty-cycle (D) may naturally begin to shrink from a maximum value, due to the regulation of the voltage loop. This inflection point may be detected and a flag may be set to indicate a discontinuous mode of operation. This flag may be used to switch from measured load current averaging to a calculated load current, as a function of averaged HS duty-cycle. In other words, the trigger event resulting in enabling diode emulation may, in this case, correspond to the inflection point where the monitored duty-cycle of HS 240 (902) begins to shrink from its maximum value. The load current may be calculated based on its relationship to the duty-cycle of HS signal 242 (902), according to the following equation:

$$I_{ave} \approx D^2 \frac{V_{in}}{V_{out}} \frac{(V_{in} - V_{out})}{(2Lf)}, \tag{4}$$

where $I_{ave}$ is the average current, D is the monitored (measured and/or obtained) value of the duty-cycle of HS 240 (902), L is the inductance of inductor 112, f is the switching frequency of HS 240 and LS 242, $V_{in}$ is the input voltage, and $V_{out}$ is the output voltage (see Regulator 100). Those skilled in the art will appreciate that the average current may be determined based on different or slightly modified formulas, which may equally be used in the algorithm described herein.

In one set of embodiments, the duty-cycle of LS signal 904 may be adjusted once per main loop iteration. That is, the duty-cycle of LS 242 may be adjusted each time the duty-cycle of HS 240 is adjusted as per the main feedback loop in maintaining regulation of $V_{out}$. The target duty-cycle of LS 242 may be calculated using equation (3), and the LS control register, which may be a register configured to hold the present value of the duty-cycle of LS signal 242 (904) may be adjusted toward the target value by a specified amount, e.g. by a unit increment, for each main loop iteration. Once the duty-cycle of HS signal 240 (902) has settled, the target duty-cycle of LS signal 242 (904) would have also settled, and the register value would have converged to the target value. This behavior may operate to prevent any voltage spikes.

Diode Emulation—Third Algorithm

In accordance with the previously described principles of the relationship between the duty-cycle of HS 242 and specified operating characteristics, such as power efficiency, of the voltage regulator, diode emulation may be performed based on continued monitoring of the duty-cycle of HS 240, making adjustments to the duty-cycle of LS 242 according to the changes in the duty-cycle of HS 240. Referring again to Regulator 100, once the specified trigger event (whether corresponding to what has been described for the first algorithm or the second algorithm above) has occurred, diode emulation may be enabled, and performed by adjusting the on-time of LS FET 110, that is, the duty-cycle of LS 242, and observing the effect of the adjustment on the duty-cycle of HS signal 240. In one embodiment, the on-time of LS FET 110 may be adjusted until the duty-cycle of HS signal 240 corresponds to the lowest energy (power) loss in the system, which, may be represented by a smallest duty-cycle value at which regulation of $V_{out}$ is maintained, as per the feedback loop in Regulator 100. In other words, since the duty-cycle has been shown to be proportional to power loss (as described above), by minimizing the duty-cycle, power loss may be minimized, thereby maximizing the efficiency.

Diode Emulation—Combined Algorithms

Figure 11:
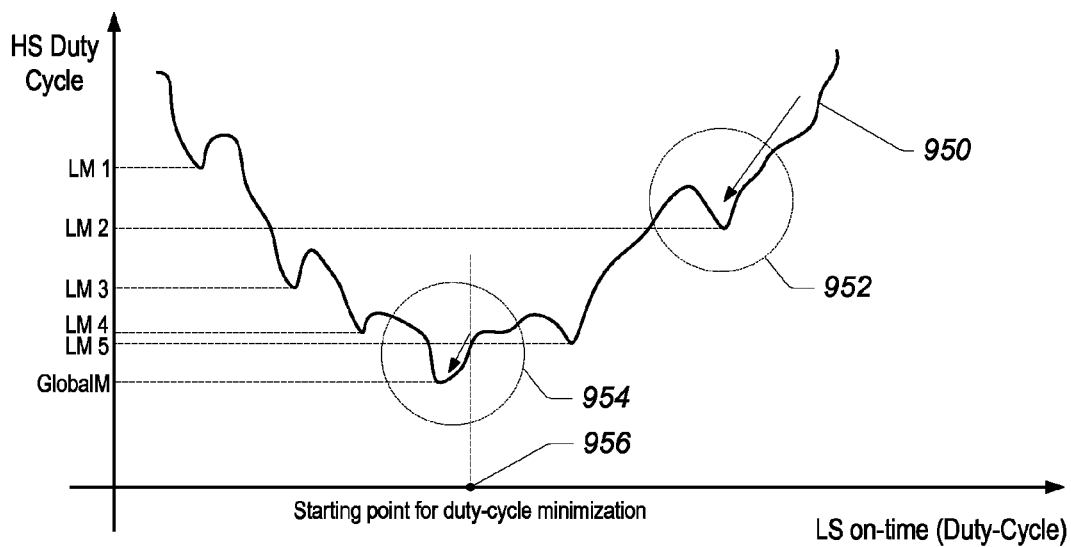
FIG. 11 shows a graph illustrating the relationship between the duty-cycle of the HS control signal and the on-time of the LS control signal, according to one embodiment.

As shown above, digital diode emulation may be implemented according to at least three separate algorithms. The first and second algorithms may be executed to recognize when the inductor enters discontinuous mode without requiring measurement circuits for determining the zero-crossing of inductor current $I_L$. However, since in both of those algorithms the target duty-cycle of LS signal 242 (904) is adjusted only until the duty-cycle of HS signal 242 stabilizes, it may not result in an optimal adjustment of the pulse width (and consequently, duty-cycle) of LS signal 242 (904) with regards to the efficiency of the voltage regulator. On the other hand, the third algorithm may execute to settle on a local minimum value of the duty-cycle of HS signal 240 (902), as opposed to a global minimum value, which may correspond to optimum system efficiency (as previously described). This is illustrated in FIG. 11, which shows a possible relationship between the HS duty-cycle and LS duty-cycle, in which local minima LM1-LM5 may exist on a function curve 950 relating HS duty-cycle to LS duty-cycle, in addition to a global minimum GlobalM, which may correspond to the smallest value of the HS duty-cycle with respect to the value of the LS duty-cycle (at point 956) at which regulation of the system output may be maintained.

As shown in encircled area 952, the third algorithm may execute to find/obtain local minimum LM2, for example, but not global (overall) minimum GlobalM. As shown in encircled area 954, the first and second algorithms may execute to properly determine a starting point for duty-cycle minimization, but not the LS duty-cycle value at which the minimum HS duty-cycle value may be obtained. Thus, the third algorithm may be combined with the first or second algorithm to ensure that the third algorithm does not execute to lock on local minima LM1-LM5. In other words, once the specified trigger event occurs (e.g. referring back to FIG. 8 regarding the first algorithm, when the averaged current falls to and/or below threshold $I_{T\_on}$, or regarding the second algorithm, when the duty-cycle of HS 240 begins to decrease from its maximum value), the first or second algorithm, respectively, may be enabled to determine a starting LS duty-cycle value based on the calculation from equation (3), and the third algorithm may subsequently be executed for minimizing the HS duty-cycle by adjusting the LS duty-cycle value until the global minimum value GlobalM for the HS duty-cycle is reached. It should be noted, again, that while FIG. 11 shows a relationship between the LS duty-cycle and HS duty-cycle in terms of obtaining a global minimum value of the HS duty-cycle, any value of the HS duty-cycle may be targeted based on a desired target level of the system characteristic which may be affected by the LS duty-cycle value. Thus, any of the algorithms may be modified according to the relationship between the control parameter (in this case the HS duty-cycle), and the independent parameter (in this case the on-time of LS FET 110, or duty-cycle of LS signal 242).

Because the diode emulation algorithms described above may be implemented through digital techniques, they may not require analog control means, such as expensive and precise zero current detection circuits, for example. In addition, as mentioned above, due to the opportunity for zero voltage switching, the most efficient switching point for turning off LS FET 110 may not be at exactly the zero current crossing (as reverse current flow in the inductor is allowed to occur). It should be noted that one or more power control systems may be configured with POL regulators operating according to the principles described above, with the POL regulators communicating with each other over a common bus, which may be a serial bus, as set forth, for example, in U.S. Publication No. 20040201279 and U.S. patent application Ser. No. 11/198, 698, which were previously indicated as being incorporated by reference as though fully and completely set forth herein.

Figure 12:
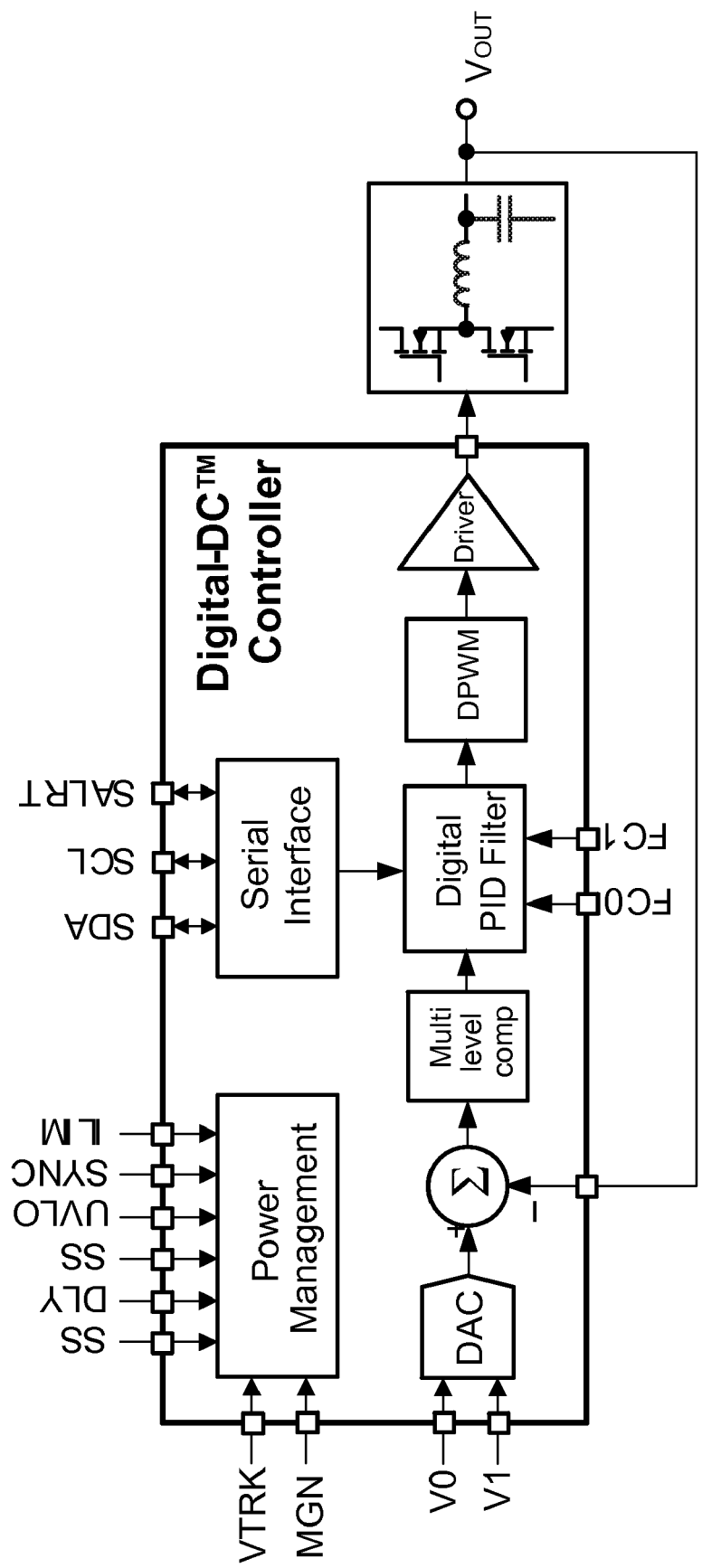
FIG. 12 shows one embodiment of a POL regulator comprising a control unit configured to perform regulation and power management functions.

For example, in one embodiment, as shown in FIG. 12, a point-of-load (POL) regulator 2000 may include a Controller 2202 and an output stage 2220 coupled together. Controller 2202 may be an integrated circuit, and output stage 2220 may comprise output switches, an inductor and a capacitor, to generate an output voltage of POL regulator 2000. Controller 2202 may include a power management unit 2204, a serial interface 2206, a digital-to-analog converter 2208, a pulse-width-modulated (PWM) control signal generating module 2216, driver circuitry 2218, and a digital filter, which may be a digital PID filter 2214. Controller 2202 may be configured to perform various power control functions and regulate the voltage output $V_{out}$ of the POL regulator through a feedback loop to summing element 2201, the feedback loop including digital filter 2214, PWM generator 2216, and driver circuit 2218. In one set of embodiments, Digital PID filter 2214 may be configured with the proper coefficients through serial interface 2206 and/or via pins FC0 and FC1.

Figure 13:
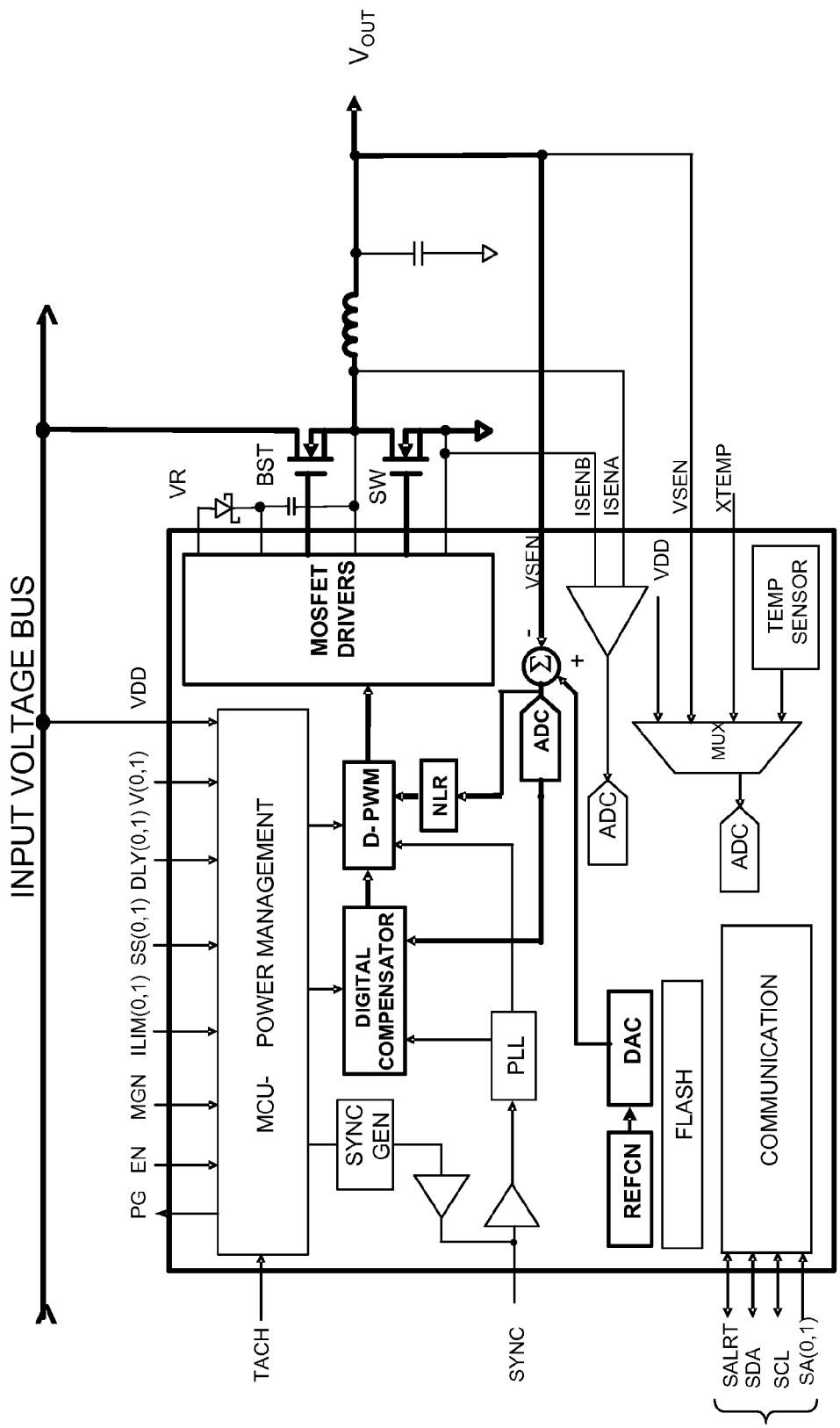
FIG. 13 shows a more detailed embodiment of the control unit shown in FIG. 22.

FIG. 13 shows a more detailed embodiment of the POL regulator 2000 from FIG. 12. As shown in FIG. 13, a Digital-DC-Controller chip may include a microcontroller 2304 configured to execute various algorithms directed at performing various power management functions, a digital compensator 2310, a PWM signal generator 2316, a sync signal generator 2306, a PLL 2314, an ADC 2322, a temperature sensor 2340, a communication interface 2330, a memory storage element 2328, which may be a flash memory, a register 2324, and MOSFET drivers 2320 for driving the high-side FET and low-side FET configured to generate the output $V_{out}$ of the POL regulator from an input voltage received through input voltage bus 2302. As indicated in the embodiment of the POL regulator shown in FIG. 13, a feedback control loop for controlling the output voltage $V_{out}$ and compensating the plant element of the POL regulator may be established via ADC 2322, which may convert $V_{out}$ into a digital value provided to digital compensator 2310, which may effect control of PWM generator 2316, which may itself control MOSFET drivers 2320. MCU 2304 may be configured to execute firmware directed at performing a variety of power management functions. For example, MCU 2304 may be configured to execute a variety of algorithms including adaptive frequency adjustment and/or diode emulation algorithms for optimizing the power efficiency of the POL regulator, load current monitoring, duty-cycle monitoring, etc.

Figure 14:
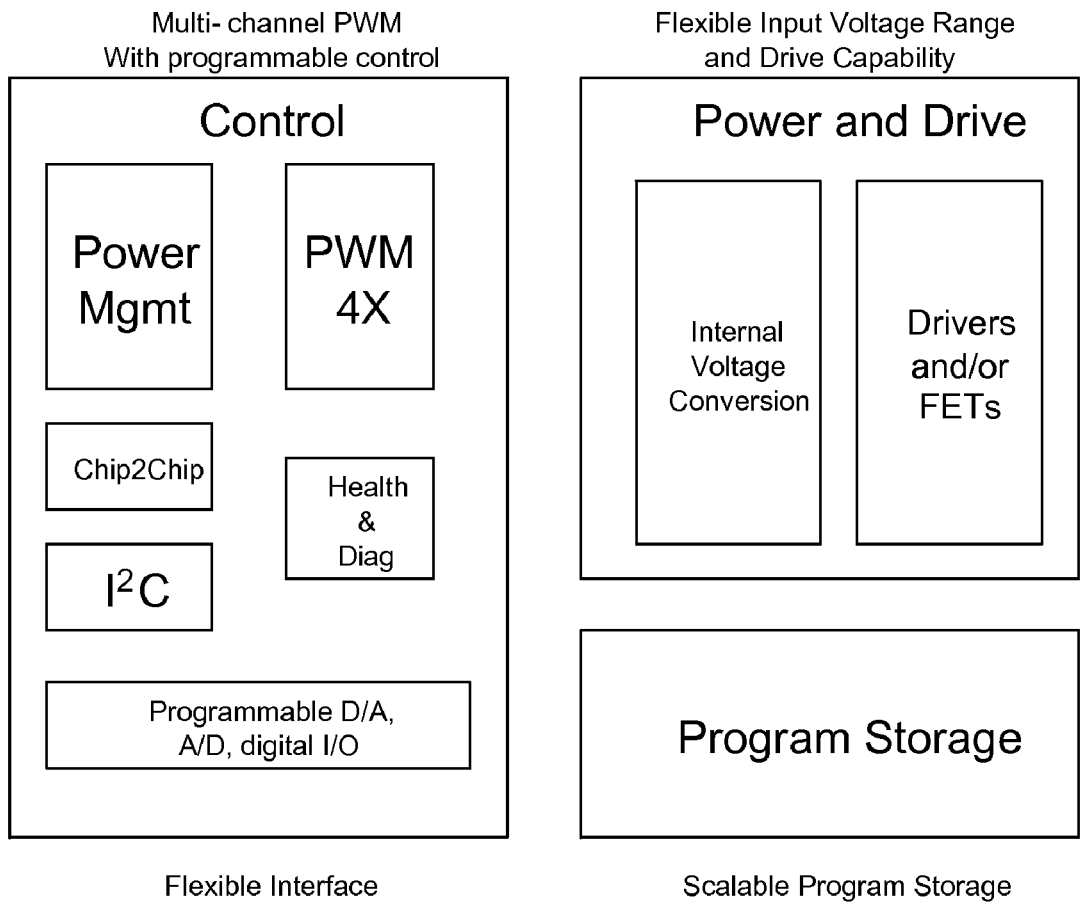
FIG. 14 shows a higher level block structure of one embodiment of a POL regulator divided into a programmable control unit, a power and drive unit, and a program storage unit.

FIG. 14 shows a higher level block structure of one embodiment of a POL regulator, which may be divided according to control and power/driver functionality. In one embodiment, a POL regulator may be partitioned into a control unit 2402 comprising power management functionality 2404, PWM control signal generation 2406, chip-to-chip 2408 and $I^2C$ 2410 communication, a diagnostic unit 2412, and programmable digital-to-analog converter, analog-to-digital converter and digital input/output block 2414. Thus, controller 2402 may operate as a pure control unit, with the power and drive block 2416 configured to interface with the output switches, inductor, and capacitor via drivers block 2420, although in some embodiments the switches (FETs) may also be included in block 2420. The power and drive section may further include internal voltage conversion circuitry 2418. Finally, the POL regulator may be configured with an independent storage element 2422, which may be configured to store various algorithms and programs executable by power management unit 2404 to perform various power management functions, including efficiency optimization, load current monitoring, adaptive frequency adjustment, diode emulation, and many others.

Although the embodiments above have been described in considerable detail, other versions are possible. Numerous variations and modifications will become apparent to those skilled in the art once the above disclosure is fully appreciated. It is intended that the following claims be interpreted to embrace all such variations and modifications. Note the section headings used herein are for organizational purposes only and are not meant to limit the description provided herein or the claims attached hereto.

We claim:

1. A method for regulating an output of a control system, the method comprising:
   monitoring the control system for a specified trigger event;
   in response to the specified trigger event:
   (a) setting a present value of a parameter of a first control signal to a specified value of the parameter of the first control signal;
   (b) obtaining a present value of a corresponding parameter of a second control signal;
   (c) in response to said obtaining, adjusting the present value of the parameter of the first control signal subsequently to said setting the present value of the parameter of the first control signal;
   (d) performing said obtaining and said adjusting until the obtained present value of the corresponding parameter of the second control signal does not deviate from a most recent previously obtained present value of the corresponding parameter of the second control signal by more than a specified first amount; and
   controlling the output of the control system using the first control signal and the second control signal.

2. The method of claim 1, wherein the control system comprises a voltage regulator and the output of the control system is the output voltage of the voltage regulator.

3. The method of claim 2, wherein the specified trigger event is one of:
   a present averaged value of a load current of the voltage regulator reaching a specified value of the load current;
   the present averaged value of the load current of the voltage regulator falling below a threshold value of the load current of the voltage regulator; or
   the present value of the corresponding parameter of the second control signal deviating from a highest value of the corresponding parameter of the second control signal.

4. The method of claim 3, further comprising calculating the specified value of the parameter of the first control signal as a function of the threshold value of the load current, the averaged value of the load current, an input voltage of the voltage regulator, the output voltage of the voltage regulator, and a first scaling factor.

5. The method of claim 3, wherein the threshold value corresponds to an averaged value of the load current of the voltage regulator at a time a present value of the load current of the voltage regulator is zero.

6. The method of claim 1, further comprising performing the following, subsequently to (d):
   adjusting the present value of the parameter of the first control signal until the present value of the corresponding parameter of the second control signal reaches a minimum value of the corresponding parameter of the second control signal.

7. The method of claim 1, wherein the parameter of the first control signal and the corresponding parameter of the second control signal are both parameters of a same signal property.

8. The method of claim 7, wherein the same signal property is duty-cycle.

9. The method of claim 1, wherein (b) comprises measuring a value of the corresponding parameter of the second control signal a plurality of times over a first time period, wherein the present value of the corresponding parameter of the second control signal is an average value of the parameter of the second control signal over the first time period.

10. The method of claim 9, wherein the first time period corresponds to a specified number of switching cycles of the control system.

11. The method of claim 1, wherein (c) comprises adjusting the present value of the parameter of the first control signal by a small step size.

12. A method for regulating an output voltage of a voltage regulator, the method comprising:
   monitoring the voltage regulator for a trigger event;
   measuring a duty-cycle of a first control signal to obtain a measured duty-cycle of the first control signal;
   in response to said monitoring indicating the trigger event:
   setting a duty-cycle of a second control signal to a specified duty-cycle;
   adjusting the duty-cycle of the second control signal subsequently to said setting the duty-cycle of the second control signal, until the measured duty-cycle of the first control signal does not deviate from a most recent previously measured duty-cycle of the first control signal by more than a specified first amount; and
   controlling the output voltage of the voltage regulator using the first control signal and the second control signal.

13. The method of claim 12, further comprising:
   monitoring a load current of the voltage regulator; and
   determining an averaged load current of the voltage regulator based on said monitoring the load current of the voltage regulator;
   wherein the specified trigger event is one of:
   the determined averaged load current of the voltage regulator reaching or falling below a threshold value; or
   the measured duty-cycle of the first control signal deviating from a highest duty-cycle of the first control signal by more than a specified second amount.

14. The method of claim 13, further comprising calculating the specified duty-cycle as a function of the threshold value, the determined averaged load current of the voltage regulator, a measured input voltage of the voltage regulator, a nominal value of the output voltage of the voltage regulator, and a first scaling factor.

15. The method of claim 13, wherein the threshold value corresponds to the determined averaged load current of the voltage regulator at a time the load current of the voltage regulator is zero.

16. The method of claim 12, further comprising performing the following, subsequently to said adjusting the duty-cycle of the second control signal:

adjusting the duty-cycle of the second control signal until the measured duty-cycle of the first control signal reaches a minimum duty-cycle of the first control signal.

17. The method of claim 12, wherein said measuring the duty-cycle of the first control signal comprises measuring the duty-cycle of the first control signal a plurality of times over a specified time period, wherein the measured duty-cycle of the first control signal is an average value of the duty-cycle of the first control signal over the first time period.

18. The method of claim 17, wherein the specified time period corresponds to a specified number of switching cycles of the control system.

19. The method of claim 12, wherein said controlling the output voltage of the voltage regulator comprises:
   controlling a first transistor device with the first control signal; and
   controlling a second transistor device with the second control signal;
   wherein the first transistor device and the second transistor device form an output stage of the voltage regulator.

20. A system comprising:
   a voltage regulator comprising an output stage configured to generate an output voltage, wherein the voltage regulator is configured to regulate the output voltage using a first control signal and a second control signal; and
   control circuitry configured to:
      monitor the voltage regulator for a trigger event;
      in response to the trigger event:
         measure a duty-cycle of the first control signal to obtain a measured duty-cycle of the first control signal;
         set a duty-cycle of the second control signal to a specified duty-cycle; and
         adjust the duty-cycle of the second control signal after the duty-cycle of the second control signal has been set to specified duty-cycle, until the measured duty-cycle of the first control signal does not deviate from a most recent previously measured duty-cycle of the first control signal by more than a specified first amount.

21. The system of claim 20, wherein the output stage of the voltage regulator comprises a high-side transistor having a first channel terminal coupled to a first channel terminal of a low-side transistor;
   wherein the high-side transistor has a second channel terminal coupled to an input voltage of the voltage regulator;
   wherein the low-side transistor has a second channel terminal coupled to a voltage reference; and
   wherein the first control signal controls the high-side transistor and the second control signal controls the low-side transistor.

22. The system of claim 21, wherein the control circuitry is configured on an integrated circuit.

23. A voltage regulator comprising:
   an output stage configured to receive an input voltage and generate an output voltage based on the input voltage;
   first control circuitry configured to generate a first control signal and a second control signal to control the output voltage; and
   second control circuitry configured to:
      monitor the voltage regulator for a trigger event;
      in response to the trigger event:
         measure a duty-cycle of the first control signal to obtain a measured duty-cycle of the first control signal;
         set a duty-cycle of the second control signal to a specified duty-cycle; and
         adjust the duty-cycle of the second control signal after the duty-cycle of the second control signal has been set to the specified duty-cycle, until the measured duty-cycle of the first control signal does not deviate from a most recent previously measured duty-cycle of the first control signal by more than a specified first amount.

24. The voltage regulator of claim 23, wherein the second control circuitry is further configured to adjust the duty-cycle of the second control signal until the measured duty-cycle of the first control signal reaches a minimum duty-cycle of the first control signal, after the duty-cycle of the second control signal has been set to the specified duty-cycle.

25. The voltage regulator of claim 23, wherein the second control circuitry is further configured to set the duty-cycle of the second control signal to the specified duty-cycle in response to a change in operating condition of the voltage regulator.

26. The voltage regulator of claim 25, wherein the change in operating condition comprises one or more of:
   a change in the input voltage;
   a change in temperature; and
   a sudden drop in a load current of the voltage regulator.

* * * * *